INVENTOR.
LUTHER H. BLOUNT

United States Patent Office 3,300,189
Patented Jan. 24, 1967

3,300,189
CONTROL FOR TRAWLER WINCHES
Luther H. Blount, Poppasquash Road,
Bristol, R.I. 02809
Filed May 17, 1965, Ser. No. 456,420
4 Claims. (Cl. 254—185)

This invention relates to the operation of winches on a trawler.

On the deck of a trawler it is usual to provide two winches, one of which has the ground line or cable to one of the leading ends of the trawl net, while the other winch has assembled on its drum the cable from the other leading end of the trawl net. Usually a man is assigned to control each of these winches, both in the hauling in of the net and in the letting out of the net.

This invention provides for the control of both ground line winches either individually or by a common control means for both hauling in the ground line at the two ends of the net or in letting out the ground lines from the two ends of the net so that they may be payed out together.

One of the objects of this invention is to provide a control by which one man may be eliminated for such control, thus permitting him to attend to other work on the deck of the trawler.

Another object of the invention is to provide an arrangement so that both winches may have the same braking action in the let out of the ground cable as the net is put overboard and let out, so that one leading end of the net will not get ahead of the other leading end of the net and the middle or cod portion of the net may be balanced.

Another object of the invention is to provide an arrangement so that the leading ends of the net may be individually controlled as well as commonly controlled when desired or to even up the ends of the net for trawling.

Another object of the invention is to provide a common drive so that both leading ends of the net may be reeled in together with an arrangement so that each may be individually controlled.

With these and other objects in view, the invention consists of certain novel features of construction as will be more fully described and particularly pointed out in the appended claims.

Figure 1:
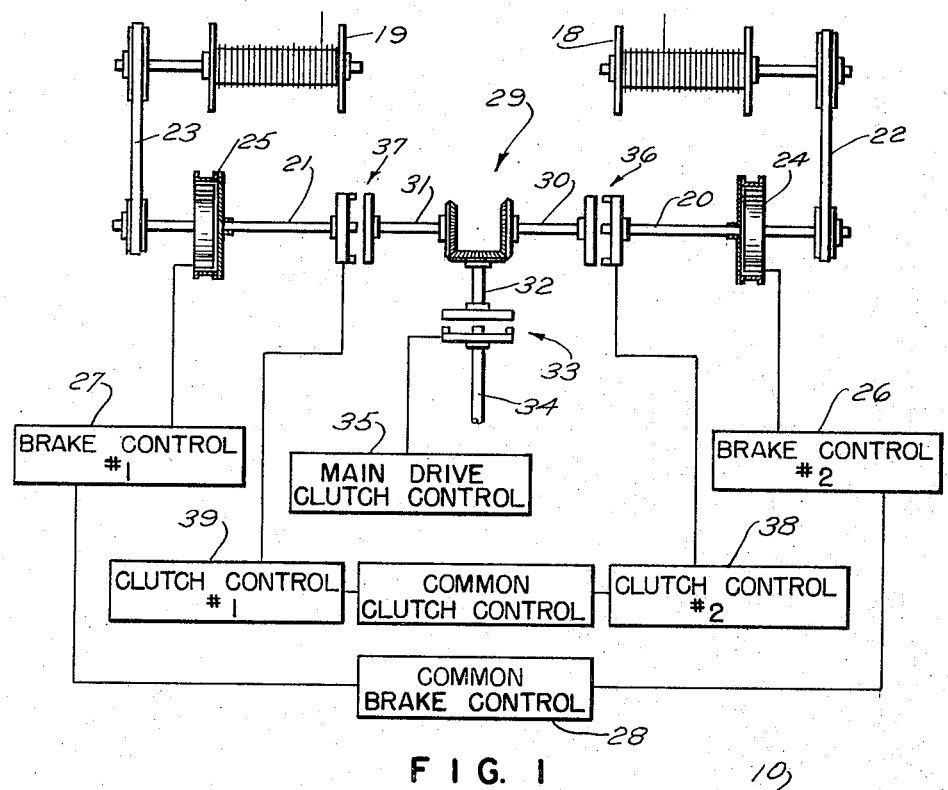
Figure 2:
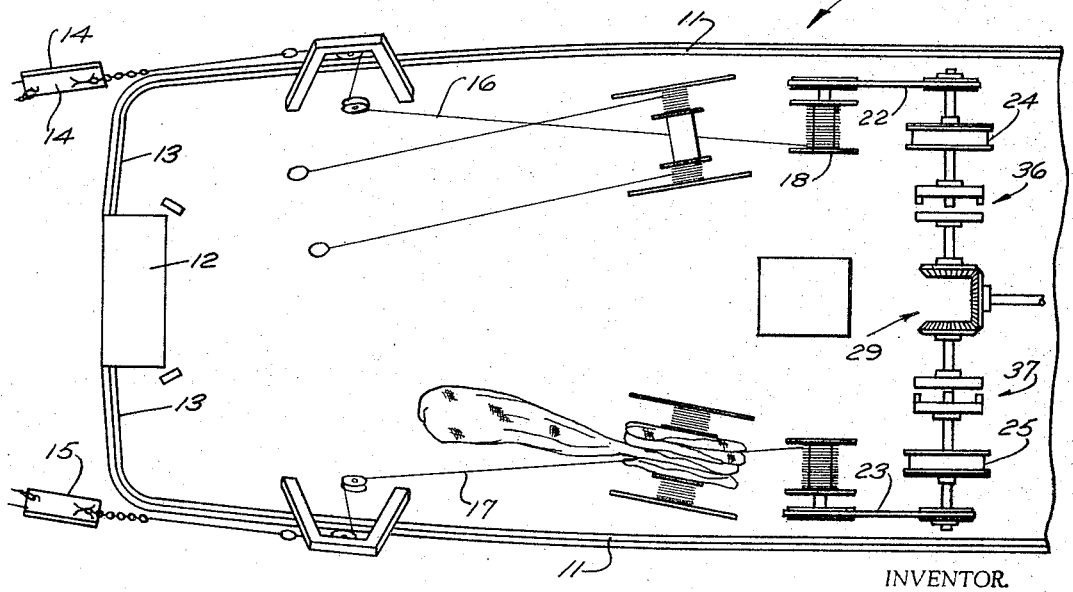

In the accompanying drawings:

FIG. 1 is a schematic diagram illustrating the hook-up of the parts of this invention to the winches which are to be controlled; and FIG. 2 is a top plan view of the after end of the deck of a trawler showing the arrangement of my invention thereon.

With reference to the drawings, 10 designates generally the deck of a trawler having bulwarks 11 on both port and starboard sides with a ramp 12 in the after bulwarks 13 through which the net may be hauled or launched as desired. The doors or otter boards 14 and 15 are interposed in the ground lines 16 and 17 which lead to the leading ends of the net as it is being towed.

The ground cable 16 leads to the drum 18 of the port winch while the ground cable 17 leads to the drum 19 of the starboard winch. These are the two winches which control the hauling in or the letting out of the ground cables to the leading end of the net.

Two separate shafts 20 and 21 are coupled to the winches such as by means of drive belts 22 and 23 for operating the drums. A brake 24 is mounted to control shaft 20 while a brake 25 is mounted to control shaft 21. These brakes are of the "Faywick" type which are air operated by the expansion of an elastic tube to apply a braking action to a drum. A control for the brake 24 is indicated at 26 while a control 27 for the brake 25 is indicated for this brake. Both of these controls lead to a common control 28 so that one control may control both fluid means to the brakes 24 and 25 in order to control the action of these two brakes the same.

A driving means for the shafts 20 and 21 is indicated at 29 as comprising driving shafts 30 and 31 driven through bevel gears from a common shaft 32 controlled by a clutch 33 which is driven by a main power source 34 and has a control at 35. Clutches 36 and 37 are arranged to connect the shafts 30 and 31 to the shafts 20 and 21 so that these may be driven in unison together. A clutch control for the clutch 36 is provided at 38 and a control for the clutch 37 is provided at 39.

By the above arrangement a single drive may be connected to or disconnected from the shaft 32 so that when the clutches 36 and 37 are engaged a single drive controlled by clutch 33 will drive both shafts 20 and 21. However, if either one of these shafts is to be driven individually the clutch may be disconnected from the other shaft allowing this shaft that is driven to catch up in hauling in.

In order to let out the cables on the winches 18 and 19, the clutches 36 and 37 may be engaged and the brakes 24 and 25 applied simultaneously through the control 28 or the shafts 20 and 21 may be independent by disconnecting the clutches 36 and 37 and the brakes individually controlled by the controls 26 and 27 or with the shafts independent through disengagement of the clutches 36 and 37 the shafts may be controlled individually through a common control so that both cables on the winches 18 and 19 may be let off together.

By the above arrangement one man may do the work of letting out or hauling in the ground cables from the leading ends of the net which had heretofore required two men to do.

I claim:

1. A control for trawler winches comprising two separate winch drums, a separate drive shaft for each drum spaced from each drum and coupled thereto said shafts being arranged in coaxial relation, a common drive for said shafts, clutch means to connect each shaft to said common drive, individual controls for each clutch and a common control for both clutches coupled to each drum, a brake for each separate drive shaft, a separate control for each brake and a common control for both brakes when the winches are locked together whereby the cables on both drums may be let off with the same braking action by the common control or individually by the separate controls.

2. A control as in claim 1 wherein the brakes are fluid actuated.

3. A control as in claim 1 wherein said separate shafts are axially spaced and said common drive for said shafts includes a shaft between and coaxial with said separate shafts.

4. A control as in claim 3 wherein a clutch controls the common drive to said shafts.

References Cited by the Examiner
UNITED STATES PATENTS
3,244,404   4/1966   Bender _____ 254—185
FOREIGN PATENTS
789,344   4/1935   France.

EVON C. BLUNK, *Primary Examiner.*
H. C. HORNSBY, *Assistant Examiner.*